July 7, 1942.  D. H. CHESTER  2,289,101
RIVET HOLE CLIP
Filed May 22, 1941
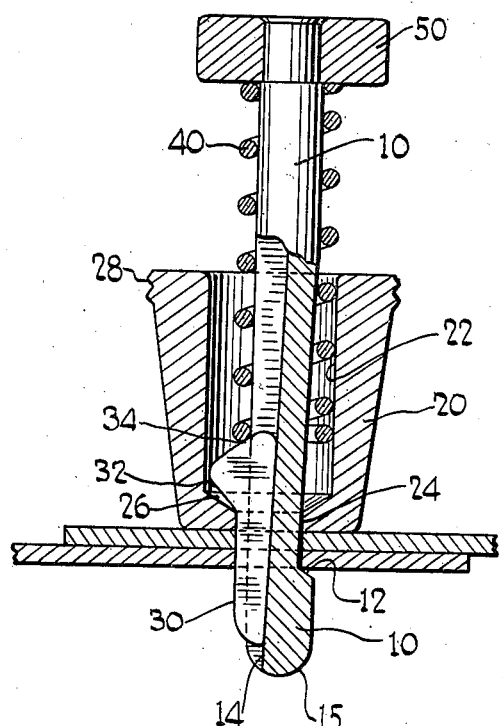
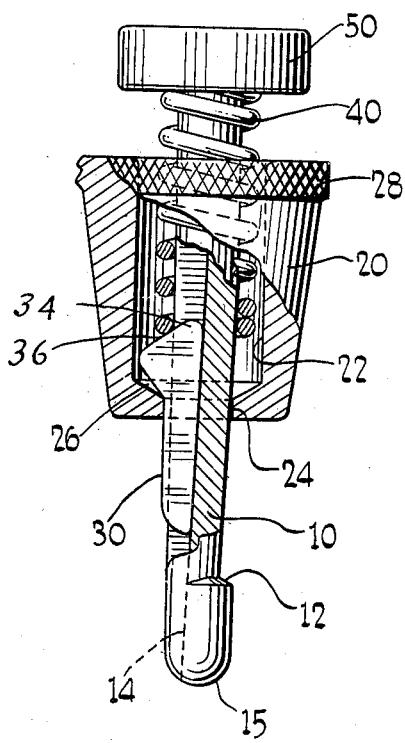
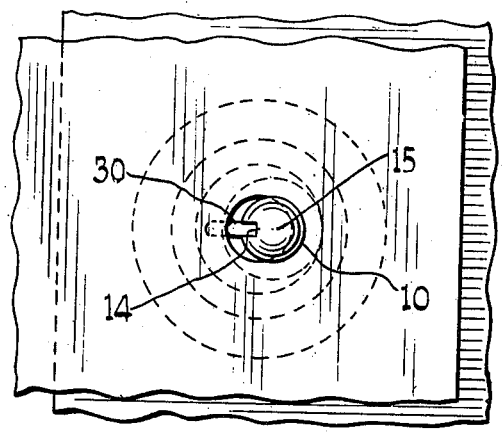
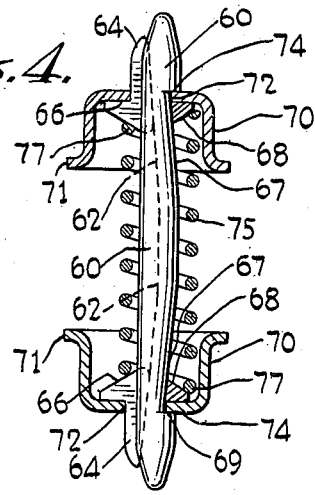
INVENTOR
DWIGHT H. CHESTER
BY Hammond & Littell
ATTORNEYS Patented July 7, 1942

2,289,101

UNITED STATES PATENT OFFICE 2,289,101

RIVET HOLE CLIP

Dwight H. Chester, Farmingdale, N. Y., assignor, by mesne assignments, to Reconstruction Finance Corporation, New York, N. Y., a corporation of the United States Application May 22, 1941, Serial No. 394,605

7 Claims. (Cl. 85—5)

This invention relates to an improved rivet hole clip, more particularly to a device for holding two or more sheets of metal together and in alignment while the sheets are being fastened more permanently by riveting, or the like.

In the practice of riveting plates together, it is customary to secure the plates provisionally to assure coaxial alignment of the rivet holes before beginning the actual riveting operation. This was, and is still, sometimes accomplished by inserting screws or bolts into some of the holes provided to receive the rivets. Unless extreme care is taken, when operating in this manner, the plates are at best but poorly aligned. This method, therefore, is time consuming, unsatisfactory or both. Because speed, as well as careful workmanship, is a desirable objective in production work, rivet hole clips have been developed in recent years to accomplish this same purpose more effectively and with less waste motion. They are very simple to insert, hold the plates firmly, and can be released and removed from the rivet holes with little or no trouble. However, the clips which have heretofore been developed are not self-centering and depend to a large extent upon their clamping action for holding the plates in proper alignment.

It is an object of this invention to provide an improved self-centering rivet hole clip which will hold plates together firmly and centralize the rivet holes to assure perfect coaxial alignment.

Another object of this invention is to provide an improved rivet hole clip whose construction allows for manufacturing error and thus permits low precision in manufacturing.

A further object of this invention is to provide a rivet hole clip that can stand a substantial amount of wear without becoming ineffective.

Other objects and advantages will become apparent as this description proceeds.

In the accompanying drawing which illustrates a preferred form of construction embodying features of this invention:

Figure 1 is a vertical section showing details of a complete rivet hole clip holding two sheets of metal together by a dual clamping and wedging action;

Figure 2 is an end view of the rivet hole clip shown in Figure 1, showing the relative positions of the plunger and wedge-shaped element with respect to the rivet holes and how these elements tend to coaxially align the rivet holes;

Figure 3 is a vertical section partly in elevation, showing detailed structure of a complete rivet hole clip with the wedge-shaped element in retracted position and the plunger ready to be inserted in a rivet hole; and Figure 4 is a vertical section of a double headed rivet hole clip showing the relative positions of the various elements.

The form of self-centering rivet hole clip illustrating an embodiment of the dual clamping and wedging features of the clips of this invention includes a plunger 10, a wedge-shaped element 30 slidably mounted in an inclined longitudinal slot 14, a collar-like element 20 encircling a portion of the plunger and the wedge-shaped element tending to hold the latter in slot 14, a spring 40 and a cap 50.

The plunger 10 of the rivet hole clip is made of a rod whose diameter is such as to fit snugly the rivet holes in which the tool is to be used. A tapering reduced portion intermediate the ends of the rods and at one side thereof forms a sharply defined shoulder 12 at the front end which acts as an abutment against which sheet material through which the plunger as been inserted can be clamped. Diametrically opposite the reduced portion the rod is further provided with a beveled slot 14 which runs in a longitudinal direction and is inclined in such a manner that its shallowest portion is at the front end of the plunger. The tapered end 15 of the plunger is provided merely as an aid in inserting the plunger into the rivet holes.

The collar-like element 20 illustrated in the drawing is a truncated cone with a relatively large bore 22 extending from its base almost to its top and with a relatively smaller bore 24 passing through the remainder of the element in coaxial alignment with the larger bore. The variance in size of bores results in the formation of a shoulder 26 within the collar-like element. When the clip is in an assembled state the collar-like element encircles a portion of both the plunger and the wedge-shaped element tending to hold the latter in position in slot 14. The element 20 is further provided with a cross-hatched surface 28 at the base end of the cone structure to facilitate frictional engagement.

The illustrated wedge-shaped element 30 is a thin leaf-like sheet of metal which fits slot 14 snugly and slides freely therein. A lateral projection 32 extends from the base end of the wedge-shaped element and cooperates with shoulder 26 of the collar-like element when the clip is in assembled condition to limit the slidable movement of the wedge-shaped element with respect to collar 20. An acute angle 34 provides at the base end of the wedge causes any pushing force exerted against the base 36 to have as a component a force tending to push the wedge more firmly into the slot 14. The working portion of element 30 tapers very gradually from the lateral projection to its far end.

The spring 40 mounted on the plunger 10 abuts cap 50 at one end and the base 36 of the wedge-shaped element at the other end causing pressure to be exerted there-against to hold the element 30 in slot 14. The force exerted on the wedge tends to push it toward the shoulder end of the plunger 10, causing projection 34 to engage shoulder 26 of collar 20, and causing the collar to be pressed into clamping position with shoulder 12 of the plunger 10.

Cap 50, which is keyed to the upper end of plunger 10 serves primarily as an abutment for spring 40.

The double headed rivet hole clip shown in Figure 4 is illustrative of another clip embodying the features of this invention. The clip there shown has a plunger 60, both ends of which are tapered, an inclined slot 62 sloping away from the ends of the plunger with the deep section in the center, two wedge-shaped elements 64 held in these slots by the restricted openings 72 of the collar-like elements 70, a spring 75 mounted on said plunger with each of the ends 77 abutting a shoulder 66 of the wedge-shaped elements and seating members 68 thereby pressing the edges 74 of the collar-like elements against the shoulders 69 formed by the double tapered restricted portion 67 intermediate the ends of the plunger, and a flange 71 provided on each of the collar-like elements providing means for gripping to draw either or both of the collar-like elements toward the other, and thereby withdraw the wedge-shaped elements from the ends of the plunger and cause them to be retracted into the deeper portions of the slot.

When rivet hole clips of the type herein described are to be used to secure provisionally plates which are to be riveted, they are inserted in one out of every four or five rivet holes (or some similar number) of the assembled plates. This (as shown in Figure 3) is accomplished by drawing the collar-like element 20 back toward the cap 50 against the pressure of spring 40 exerted on shoulder 26 through projection 32 of the wedge-shaped member. This simultaneously causes the wedge-shaped member to be pulled back from the end of the plunger. Since the plunger tapers through the length of that portion over which the collar-like element is pulled, the restricted opening 24 fits the plunger more and more snugly thus causing the wedge-shaped element mounted in the inclined slot in the plunger between it and the collar-like element to be retracted into the deepening slot in the plunger as the collar-like element is pulled back. The plunger 10 is then inserted into the rivet holes of the plates to be aligned to a point beyond shoulder 12 of the plunger, and thereupon releasing the collar-like element. This releases the wedge-shaped member and causes it to slide forward toward the plunger tip and project from the slot. In doing this the wedge is forced down into the rivet holes where it cooperates with the plunger to center the clip and place the rivet holes in perfect coaxial alignment. At the same time, the spring 40 will cause the collar-like element 20 to cooperate with shoulder 14 to hold the plates together in clamped position therebetween.

After the riveting operation has begun and the temporary aligning means are no longer necessary, the clips may be removed very readily by drawing the collar back against the spring pressure and thus again retracting the wedge element 30, whereupon the plunger can readily be withdrawn from the rivet holes.

The dual clamping and wedging action of the rivet hole clips of this invention permits them to be used where both speed and careful workmanship are essential. The wedging action effected by the spring actuated wedge and plunger gives the clip its self-centering feature, serving to centralize the clip in the rivet holes and thus insure perfect coaxial alignment. The clamping action is effected in two independent ways. The major portion is effected by the spring pressed collar which cooperates with the shoulder on the plunger to clamp and firmly hold the plates together. The remainder is effected by the slightly tapered wedge.

The slight taper of the wedge gives the clip many desirable features. It helps to keep down the cost of production of the clip since it permits a rather wide limit of manufacturing error without detrimentally affecting the effectiveness of the clip. This permits low precision manufacturing, a very desirable feature. The taper on the wedge also aids in improving the effectiveness of the clip. It counteracts the angle produced by the inclined slot making the working edge substantially parallel to the axis of the plunger. This is of considerable help in centralizing the rivet holes, because it enables the wedge to engage the sides of both superimposed plates with substantially equal force. Because of this, it also helps to clamp the plates together by the produced wedging action. Furthermore, since the tapered surface is also the surface subjected to the most wear, the life of the tool is increased immeasurably due to the fact that the tapered contact automatically compensates for wear.

Another desirable feature of the device of this invention resides in the fact that the wedge-shaped element is provided with a long bearing surface. This feature provides long wearing qualities, since the full length of the wedge bears against the plunger at all times.

Other desirable features of the clips of this invention and advantages to be gained by their use will become apparent to those skilled in the art.

It will be understood that the embodiment of my invention described in this specification and illustrated by the drawing is only one form of the rivet hole clip of this invention. I therefore desire an interpretation of the invention which is fully commensurate with its contribution as set forth in the claims appended hereto.

I claim:

1. A temporary rivet for holding a plurality of sheets of material together in desired alignment while the sheets are being assembled comprising a plunger, a reduced portion intermediate the ends of said plunger, a sharply defined shoulder at one end thereof, a longitudinal slot in said plunger, a wedge-shaped element slidably mounted in said slot, means mounted on said plunger to hold said wedge-shaped element in said slot, and means for bringing said wedge-shaped element and said plunger into wedged engagement with the sides of any restricted opening through which the end of the plunger is inserted.

2. A temporary rivet for holding a plurality of sheets of material together while the sheets are being assembled comprising a plunger, a collar-like element slidably mounted thereon, a reduced portion intermediate the ends of said plunger, a shoulder at one end thereof formed by said reduced portion, a longitudinal beveled slot in said plunger with the shallow portion at the shoulder end of said plunger, a wedge-shaped element slidably mounted in said slot and held therein by means of said collar-like element and means for bringing said collar-like element and said shoulder in clamping position and said wedge-shaped element and said plunger into wedged engagement with the sides of rivet holes in the sheets through which the plunger has been inserted.

3. A temporary rivet comprising a plunger, a collar-like element slidably mounted thereon, a reduced portion intermediate the ends of said plunger, a sharply defined shoulder at one end formed thereby, a longitudinal beveled slot in said plunger inclined away from said shoulder end, a wedge-shaped element slidably mounted in said beveled slot in slidable relationship to said collar-like element and held therein by said collar-like element, a lateral projection on said wedge-shaped element, said projection being engageable by said collar-like element for limiting slidable movement of said wedge-shaped element, pressure means for forcing said collar-like element into clamping relationship with said shoulder and for forcing said wedge shaped element and plunger into wedging position against the sides of the material when said plunger end is inserted in rivet holes therein.

4. A temporary rivet comprising a plunger, a longitudinal beveled slot in said plunger, a reduced portion intermediate the ends thereof, a shoulder formed thereby, a wedge-shaped element slidably mounted in said slot, a collar-like element slidably mounted on said plunger and said wedge-shaped element holding said wedge-shaped element in said slot, pressure means for holding said collar-like element in clamping relationship with said shoulder and for pressing said wedge-shaped element toward the shoulder end of said plunger.

5. A temporary rivet comprising a plunger, a longitudinal beveled slot therein, a reduced portion intermediate the ends thereof, a shoulder formed thereby at one end of said plunger, a wedge-shaped element slidably mounted in said slot, a collar-like element slidably mounted on said plunger and said wedge-shaped element, a lateral projection on said wedge-shaped element, said lateral projection being engageable by said collar-like element and limiting slidable movement of said wedge-shaped element, and a spring mounted on said plunger, said spring abutting the wedge-shaped element at one end pressing said wedge-shaped element toward said shoulder end of said plunger and pressing said collar-like element into clamping position with said shoulder on said plunger.

6. A temporary rivet comprising a plunger, a longitudinal beveled slot therein, a tapered reduced portion intermediate the ends thereof, a shoulder formed by the abrupt ending of said reduced portion toward one end of said plunger, a wedge-shaped element slidably mounted in said slot, a lateral projection on said wedge-shaped element, a collar-like element slidably mounted on said plunger and encircling said lateral projection of said wedge-shaped element, a spring mounted on said plunger abutting said wedge-shaped element at one end pressing said wedge-shaped element toward said shoulder end of said plunger and pressing said collar-like element into clamping position with said shoulder on said plunger.

7. A double-headed temporary rivet comprising a plunger tapered at both ends, an inclined slot in said plunger sloping away from both ends of said plunger with the deep section in the center, a double tapered restricted portion on said plunger intermediate the ends and opposite said inclined slot, shoulders formed near the ends of said plunger by the abrupt ending of said restricted portion, wedge-shaped elements held in the slot toward each end of said plunger, collar-like elements encircling said plunger and a portion of said wedge-shaped elements, and a spring mounted on said plunger between said wedge-shaped elements with the ends thereof abutting said wedge-shaped elements and pressing each of them toward an end of said plunger and the collar-like elements into clamping engagement with said shoulders.

DWIGHT H. CHESTER.